United States Patent Office 3,385,418
Patented May 28, 1968

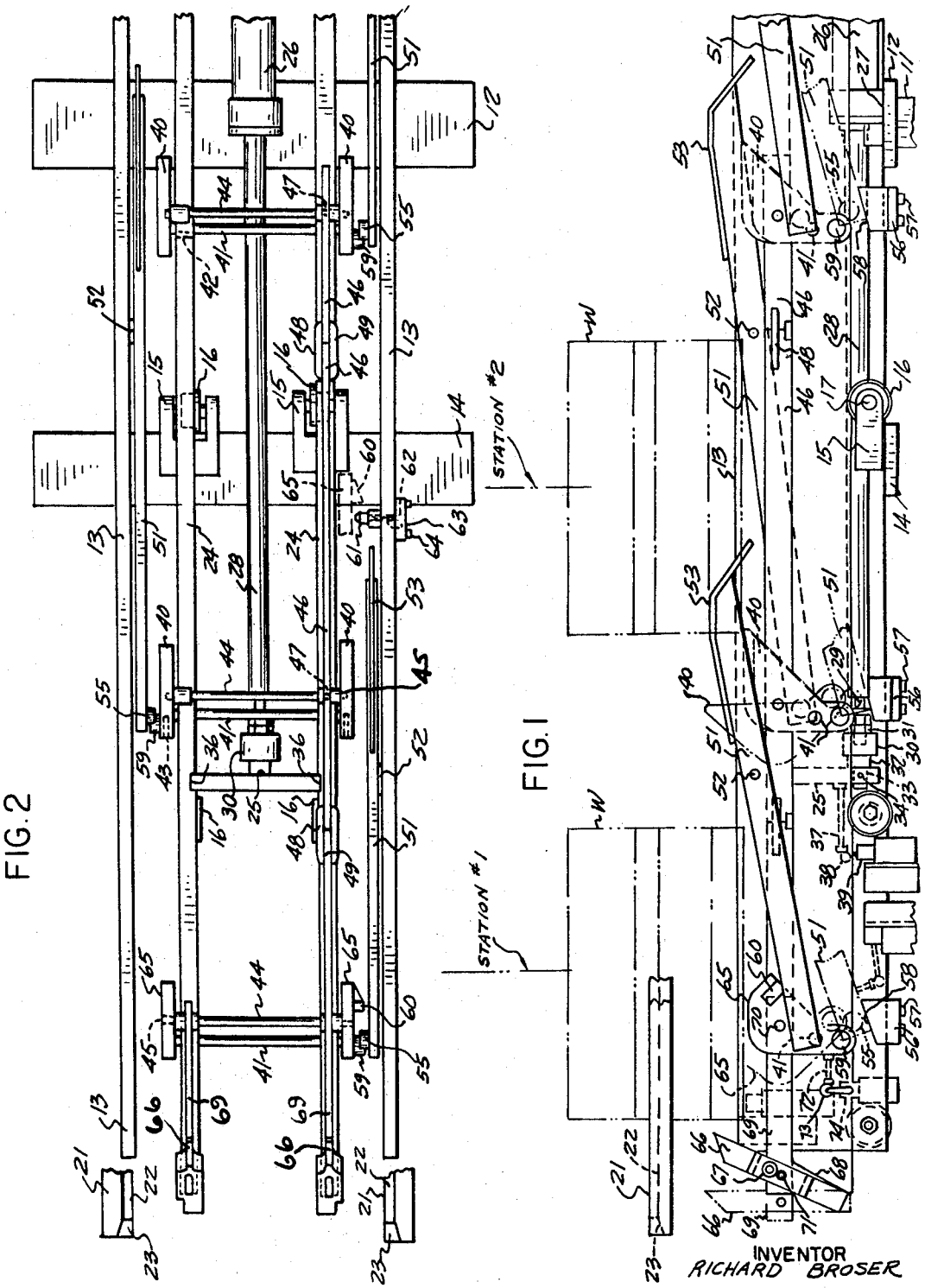

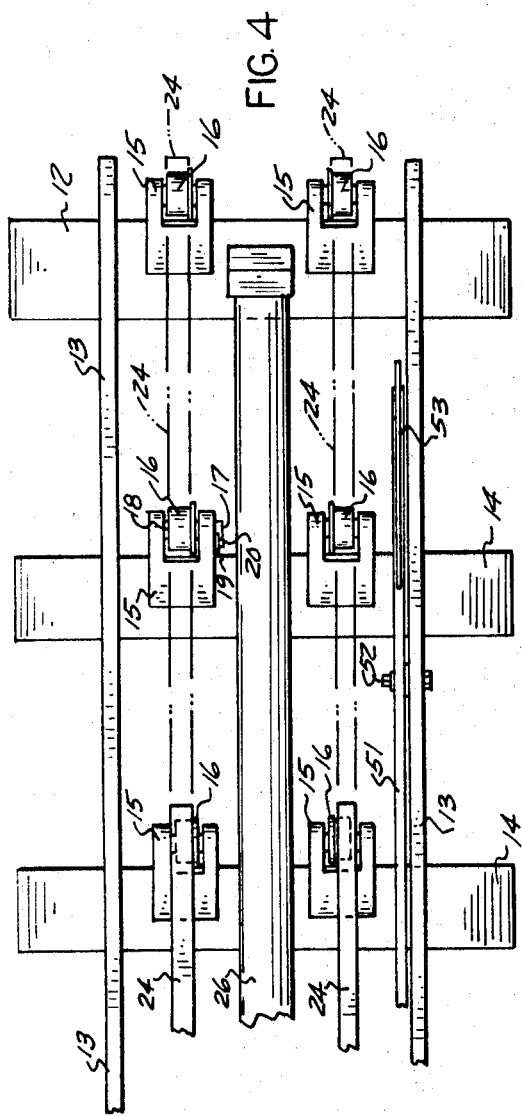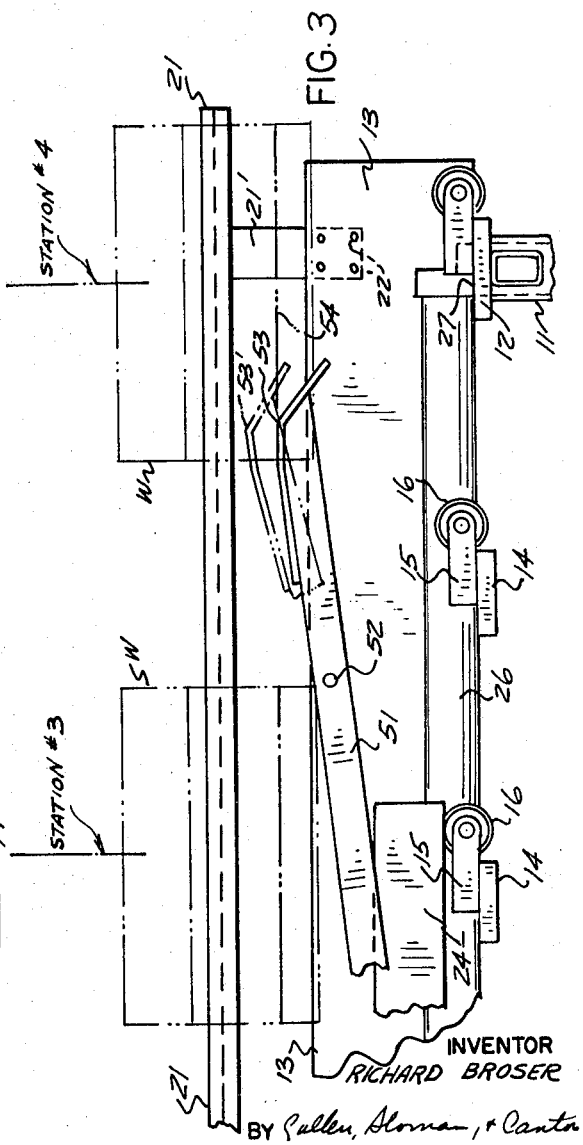

3,385,418
AUTOMATIC ACCUMULATING
TRANSFER MECHANISM
Richard Broser, Royal Oak, Mich., assignor to
Accum-Matic Systems Inc., Detroit, Mich.
Continuation-in-part of application Ser. No. 584,445,
Oct. 5, 1966. This application Aug. 10, 1967, Ser.
No. 659,631
10 Claims. (Cl. 198—221)

ABSTRACT OF THE DISCLOSURE

The present invention is directed to an automatic accumulating transfer mechanism which is continuously reciprocal between and below a pair of workpiece support and guiding rails over which workpieces are moved from station to station, said transfer bars having pivotally mounted thereon in pairs, a series of longitudinally spaced workpieces engaging dogs which have a tilted inoperative position and an upright control position for activating an individual workpiece and slidably moving the same upon said rails, and incorporating cam detector controls pivotally mounted intermediate each station by which the presence or absence of a workpiece at a particular station controls said detector for regulating the positioning of the next succeeding pair of workpiece engaging dogs in an automatic manner so that a workpiece upon said rails and the succeeding spaced workpieces therebehind will be simultaneously moved forwardly successively between work stations so that in an automatic manner the pushing dogs are rendered operative when there is a requirement for advancing the parts on a production line and rendered inoperative when such requirement does not exist.

---

The present invention relates to a mechanical, automatic accumulating transfer mechanism for conveyors, and is a continuation-in-part of my copending patent application Ser. No. 584,445, filed Oct. 5, 1966, entitled "Automatic Accumulating Transfer Mechanism."

It is an object of the present invention to provide an automatic accumulating transfer mechanism for the movement of a series of workpieces along supporting rails by which the mechanism automatically senses the necessity for rendering the pushing dogs corresponding to a particular station operative for advancing the workpieces successively from station to station.

In an automation line employing a reciprocating transfer mechanism incorporating a series of dogs which are effective normally for pushing or sliding workpieces along such line in an automatic fashion from station to station, it is absolutely required that when all the stations are filled with the corresponding workpiece, that the respective dogs remain in inoperative clearance position in order to prevent an undesired longitudinal feed movement of a workpiece which is yet to be machined or worked upon.

It is an object of the present invention to provide an automatic accumulating transfer mechanism by which the machine automatically senses the necessity for rendering the corresponding pushing dogs operative for advancing the workpieces succesively simultaneously as desired from station to station in an automatic manner.

It is another object to provide an automatic accumulating transfer mechanism which maintains a full conveyor at all times keeping the respective workpieces moving as fast as possible from one station to the next station.

It is another object to incorporate in the present accumulating transfer mechanism means by which one is able to remove a workpiece from any station on the conveyor system and wherein the remainder of the workpieces on the conveyor system will continue to move in a steady flow from station to station filling up any empty stations and in a continuous manner.

It is another object to incorporate in the present accumulating transfer mechanism means by which when a workpiece has been removed from a particular station the machine has a sensing mechanism which will permit all parts behind the space left by the removed workpiece to be moved upward simultaneously in a steady flow without moving forwardly those parts ahead of the empty station.

It is another object of the present invention to incorporate control mechanism by which all of the respective pairs of work engaging dogs are mechanically pivoted to an inoperative position automatically on retraction of the transfer mechanism which carries the dogs and whereby it is not necessary for the dogs to move against or to operatively engage the succeeding workpieces under which they move in order for the dogs to be tipped to inoperative position automatically.

It is another object of the present invention to provide an improved trip arm assembly wherein a series of the said trip arms are slidably mounted in alignment upon the respective transfer bar and intermediate their respective ends pivotally connected to the corresponding dog tie bar whereby when any particular pair of dogs has been mechanically tilted to operative work engaging position on retraction of the transfer bar all of the succeeding pairs of work engaging dogs will be similarly moved from inoperative to operative position automatically.

It is another object of the present invention to provide a pair of load control dogs upon the said transfer bars which have a normal inoperative control position and which under a similar automatic control can be tipped to a control position and which are connected by suitable linkage to a corresponding pair of normally inoperative load cams connected with said transfer mechanism and which move in unison with the said control dogs and under the control of said dogs are adapted to move a workpiece onto the present transfer mechanism in an automatic manner whenever the first station is open for this purpose.

These and other objects will be seen from the following specification and claims in conjunction with the appended drawings in which:

FIG. 1 is a fragmentary side elevational view of the present accumulating transfer mechanism.

FIG. 2 is a corresponding plan view thereof.

FIG. 3 is an extension of FIG. 1.

FIG. 4 is a plan view thereof.

Referring to the drawings, the present mechanical automatic accumulating transfer mechanism includes a pair of longitudinally spaced bases 11 mounting transverse support plates 12 over which are secured a pair of parallel spaced upright support rails 13 upon which a series of spaced workpieces W are slidably mounted in an automation line.

A series of longitudinally spaced transverse spacers 14 interconnect said rails, and to which are secured roller mounting plates 15 bifurcated at 18 to receive flanged rollers 16 journalled upon the shaft or pin 17 anchored upon the corresponding plate 15 by locking disk 19 and fastener 20, FIG. 4.

Elongated horizontally disposed side guide rails 21 extend along and adjacent the rails 13 for receiving the workpieces W guidably therebetween as the same are moved along the said rails by the transfer mechanism hereafter described. The respective rails 21 as shown in FIG. 1 fragmentarily have suitable upright supports 21' secured to the said rails 13 as at 22'.

Each of said rails towards the left end of the assembly, FIG. 2, at points in advance of rails 13 have elongated support ledges 22 over which the workpieces W are movably positioned, there being at the forward end of said guides 21 the tapered guide 23 for guiding the said workpieces W onto the ledges 22 for movement onto the rails 13 by the present unload mechanism forming a part of the transfer device hereafter described.

A pair of parallel spaced upright transfer bars 24 fixedly interconnected as by the spacer bar 25, FIGS. 1 and 2, is mounted for reciprocal and guided movements upon the flanged rollers 16 which rollers 16 are positioned below the upper edge supporting portions of the rails 13.

A suitable reciprocal power means is employed joined to the said transfer bars 24 for effecting reciprocal movements thereof in unison. For this purpose there is provided a hydraulic or pneumatic motor 26 which is mounted as at points 27 upon the support plates 12 forming a part of the base assembly for the rails, which motor or cylinder includes a reciprocating piston and connected thereto an elongated piston rod 28 which at its free end terminates in the threaded connecting stud 29, FIG. 1. Stud 29 is adjustably threaded into the connector body 30 and anchored thereto by lock nut 31. Connector body 30 has a boss 32 whose reduced threaded shank 33 projects into a corresponding aperture through the spacer connector (25) drive plate for the said transfer bars and is fixedly secured thereto as at 34. Accordingly, reciprocal movements of the piston rod 28 from the cylinder or motor 26 effect corresponding reciprocal movements of the respective parallel spaced upright transfer bars 24 upon their flanged rollers or supports 16 so that the said transfer bars are reciprocally mounted between the said rails 13 and below their upper work supporting edges for movement in a continuous reciprocating fashion.

As shown in FIGS. 1 and 2, the respective connector drive plate 25 is interposed between adjacent portions of the transfer bars 24 and fixedly secured thereto as by welding at 36, FIG. 2, or other suitable fastening means.

As shown in FIG. 1, the elongated control button 37 projects rearwardly from and is secured to the connector plate 25, and in the retracted position shown of the said transfer bar assembly is in operative engagement with the control arm 38 upon limit switch 39 which forms a part of a control mechanism associated with the present transfer device. Thus the limit switch 39 is activated each time that the transfer bar has been retracted to its rearmost position.

A series of transversely spaced pairs of longitudinally aligned dogs 40 are pivotally mounted upon the respective transfer bars 24 exteriorly thereof as by the pivot mountings or tie bars 41, FIG. 2. The tie bar 41 extends through bushings 42 on transfer bars 24, and dogs 40 are secured at 43 to the ends of each tie bar. The said pairs of dogs 40 are longitudinally spaced along the length of said transfer bars, corresponding to a series of spaced work stations between the respective rails 13. Said dogs are reciprocally movable continuously between adjacent stations for the purpose of moving a workpiece over said rails 13 as desired from one station to the next succeeding station. Stop bar 44 overlies bars 24 and its reduced ends 45 extend into each of the opposed dogs 40 for limiting their pivotal movements.

Each of the said pairs of dogs 40 have an upright work engaging position such as shown in the drawings, and an inoperative forwardly inclined inoperative work clearance position as shown in dotted lines.

The present invention is directed to an automatic means by which on retracting movements of the respective transfer bars in unison means are provided by which the respective workpiece engaging pairs of dogs are tilted to an inoperative position.

A series of longitudinally aligned trip arms 46 is movably mounted and supported upon one of the transfer bars 24, and intermediate its ends, each of the said trip arms is pivotally connected as at 47 to the corresponding stop bar 44 between each pair of dogs 40. Thus, the corresponding trip arm 46 will move in unison with a corresponding movement of said pair of dogs, as the same tilts with respect to their supporting transfer bars.

Upon the rear of each trip arm 46 and extending rearwardly thereof is a bifurcated stirrup 48 whose slotted portion 49 encloses and guidably receives the forward end portion of the next succeeding trip arm. This strip arm is in alignment with the first trip arm and is movably positioned over and along transfer bar 24, and intermediate its ends is similarly connected to the next adjacent pair of dogs 40, by a similar stop bar 44. Thus a series of said trip arms 46 are aligned end to end, each pivotally connected to an adjacent pair of dogs.

A series of downwardly and rearwardly inclined workpiece detector cam arms 51 is pivotally mounted off center as at pivot points 52 upon and adjacent the interior walls of the respective rails 13 in an alternate fashion, said pivot points 52 being interposed between the respective work stations. Detector plate 53 is mounted upon the forward end portion of cam arm 51 and is adapted for engagement by a workpiece W at one station for normally maintaining the cam arm 51 in an inoperative position shown in solid lines 51. In the absence of a workpiece W at the particular station towards the right end of FIG. 3 the cam arm 51 will pivot by gravity to the control position fragmentarily shown in dotted lines, FIG. 1, to rest upon the inclined portions 58 of stop support 56 secured to the said rail as at 57.

The detector plate 53 engages an under surface portion 54 of a workpiece W which normally holds the cam arm 51 in the inoperative position shown.

Control cam 55 projects inwardly of the rearward end of cam arm 51 so that when the cam arm 51 has automatically tilted to the dotted line position shown fragmentarily the said cam 55 will be in the path of retracting movement of the corresponding roller 59 carried by the respective dogs 40. Thus, normal retracting movement of the transfer bars and dogs 40 pivotally mounted thereon will cause the said dogs to be tilted back up to a workpiece engaging upright position shown in solid lines, as the corresponding rearwardly moving roller 59 of the respective dogs moves into engagement with the corresponding cam 55 on cam arm 51.

A control means is incorporated into the present transfer mechanism, by which upon retracting movement of the transfer bars the connected dogs 40 are automatically tipped into inoperative position. The last or control dog 65 of a conveyor section has mounted upon its exterior surface a laterally extending cam 60, whose outer tapered surface extends rearwardly and outwardly and on forward movement of transfer bars 24, cams against the retractable button 61. The latter is biased inwardly by spring 62, with respect to button mount 63 secured at 64 to the adjacent rail 13. Said retractable button 61 normally lies in the path of forward movement of control dog 65. The latter in a pair is mounted the same as dogs 40. As cam 60 bears against button 61 it retracts momentarily and then snaps back to the position shown in FIG. 2. As the transfer bars retract the rear upright edge portion of cam 60 operatively engages button 61, by which cams 65 are automatically tilted forwardly to an inoperative position. By virtue of the trip arms 46, the forward tilting of dog 65 causes all the dogs 40 forwardly thereof to also tilt to inoperative position.

Towards the end of the rearward movement of the transfer bars with the dogs 40 and central dogs 65 all in an inoperative position, the automatic sensing mechanism including cam arms 51 causes certain pairs of dogs 40 and/or dogs 65 to be mechanically tipped or cammed to an upright workpiece engaging position, whenever the station in advance of the particular set of dogs is empty, so that the transfer mechanism is effective for sliding a workpiece W upon rails 13 from a particular station to the next empty station, with all following workpiece moving forwardly to fill all stations.

The respective cam arms 51 are thus in the nature of a sensing mechanism which senses the need for automatic control of the dogs 40 and 65 into operative position so that the said workpieces will be moved forwardly into an empty station being the first empty station upon the said rails.

This is determined by the fact that if a station is empty of a workpiece W, the corresponding cam arm 51 will gravitate to the dotted line control position shown at 51, in dotted lines, engaging stop 58. This is a control position of the cam arm 51 such that the set of dogs 40 rearwardly of said empty station will be automatically cammed or tilted to the upright work engaging position shown.

Control dogs

Adjacent the rear portions of the respective transfer bars 24 are a pair of transversely spaced load control dogs 65 pivotally mounted upon said transfer bars as at 41 in the same manner as the other dogs 40. These have a normally inoperative position shown in solid lines, being an upright position, and a dotted line rearwardly inclined control position as shown in FIG. 1. The pair of load control dogs 65 are also interconnected by a similar tie rod 44 so that dogs 65 rotate in unison about pivot support 41. Again control dogs 65 are actuated for movement from the inoperative position shown in solid lines to the operative position shown by a similar arrangement of cam detector arm 51 with associated cam 55 in cooperation with the corresponding inwardly directed roller 59 on dog 65. This occurs if station number 2 is empty, under control of the nearest cam detecting arm 51, or if any other forward station is empty.

Rearwardly of the respective ends of transfer bars 24 are a pair of pivotal load cams 66 which have an inclined inoperative position, being pivotally mounted on the links 69. Load cams 66 have an upright control position, shown in dotted lines, so that in said position forward movement of the transfer bars through links 69, will cause load cams 66 to operatively engage a workpiece W at storage station number 1 for moving the same over the rails 13 to station number 2. For this purpose there is provided between the respective dogs 65 and 66 a pair of parallel links 69. These links at their forward ends are pivotally connected at 70 to control dogs 65 and at their rearward ends are pivotally connected to the respective load cams 66 as at points 71.

In the continuous reciprocal movements of the transfer bars 24, the control dogs 65 will normally remain inoperative so that no additional workpieces will be moved onto the rails 13 unless and until station number 2 has been emptied by removal of the corresponding workpiece W from the corresponding control arm 51 towards the left end of FIG. 1. If that station is empty then the control arm 51 at the left end of FIG. 1 will be tilted to the dotted line control position shown causing the control dogs 65 to move rearwardly to the inclined control position shown causing the said links 69 to tilt the loading cams 66 to the upright position for operative engagement with a workpiece at storage station number 1 for sliding the same over the rails on the next forward movement of said transfer bars. This will also occur by action of trip arms 46 when any forward station is empty and all workpieces rearwardly thereof are to move forward one station.

As shown in FIG. 1 when the load control dogs 65 are in operative position they are tipped mechanically to inoperative position shown in solid lines. The adjustable button 72 carried by one of the dogs 65 will release arm 73 upon limit switch 74 or to indicate that the load control cam 65 has been tilted to inoperative position indicating that the conveyor line is full and to energize a solenoid to cut off the power to feed motor 26.

Having described my invention reference should now be had to the following claims.

I claim:
1. In a mechanical, automatic, accumulating, transfer mechanism including a pair of parallel spaced support rails upon which a series of spaced workpieces are slidably mounted in an automation line;
   longitudinally spaced pairs of support rollers below and inwardly of said rails;
   a pair of longitudinally extending spaced transfer bars reciprocally and guidably mounted on said rollers below said rails;
   reciprocal power means joined to said transfer bars for movement in unison;
   a series of aligned dogs pivotally mounted upon said transfer bars longitudinally spaced thereon corresponding to a series of work stations along said rails and reciprocally movable continuously between adjacent stations respectively;
   said dogs having an upright workpiece engaging position;
   means for automatically tilting said dogs to a forwardly inclined inoperative work clearance position on retraction of said transfer bars;
   a downwardly and rearwardly inclined part detector cam arm pivotally mounted off center upon one of said rails intermediate each pair of adjacent stations engageable at its upper forward end and movable by a workpiece at one station to maintain said cam arm in an inoperative position, and normally pivoted by gravity to a control position;
   a control cam at the lower rearward end of said cam arm and positioned adjacent the next preceding station;
   and a cam roller on each dog operatively engageable with said control cam on retraction movement of said transfer bars when said cam arm is in control position to automatically pivot the corresponding dog into upright work engaging position.

2. In the transfer mechanism of claim 1, said dog tilting means including a cam laterally mounted on the last dog and having a rearwardly and outwardly tapered cam surface; a retractable spring biased button upon and projecting inwardly of an adjacent rail normally in the path of forward movement of said dog and retractible thereby; said button operatively and retainingly engaging said dog on retraction of said transfer bars, and movable means connecting said last dog with all dogs forwardly thereof for automatically tilting them to inoperative position.

3. In the transfer mechanism of claim 1, said support rollers being flanged;
   and said transfer bars retainingly engaged by said support rollers for sliding movement in a pre-set path.

4. In the automatic transfer mechanism of claim 1, a stop on said rails engageable with each cam limiting its pivotal movement into operative control position.

5. In the automatic transfer mechanism of claim 1, a part detector plate mounted upon the upper forward end of said cam arm normally lying in the path of sliding movement of said workpieces.

6. In the automatic transfer mechanism of claim 1, said dogs being arranged in pairs;
   the pivotal mounting of said dogs including a tie bar interconnecting each pair of dogs spanning and journalled through said transfer bars for pivotal movement of said dogs in unison and for operative engagement of said dogs with said workpieces.

7. In the transfer mechanism of claim 6, and a transversely extending stop bar interconnecting each pair of dogs, overlying said transfer bars and engageable therewith limiting pivotal movements of said dogs.

8. In the automatic transfer mechanism of claim 1 said means for tilting said dogs including a series of endwise engaging longitudinally extending aligned trip arms mounted on one transfer bar, each trip arm intermediate its ends pivotally connected to an adjacent dog;

a rearwardly opening guide means upon the rear end of each trip arm except the last trip arm extending rearwardly thereof and cooperatively and guidably receiving the forward end of a succeeding trip arm respectively;

automatic cam arm controlled pivotal movement of a dog to workpiece engaging position causing a corresponding retracting movement of the connected trip arm and all trip arms rearwardly thereof tipping all succeeding pairs of dogs into operative position.

9. In the transfer mechanism of claim 1, said reciprocal power means including a cylinder with reciprocal piston intermediate and fixedly secured to said rails and positioned below said transfer bars;

a transverse spacer interconnecting said transfer bars;
a piston rod movably projecting from said cylinder;
and means adjustably connecting said rod to said spacer.

10. In the transfer mechanism of claim 1, a pair of load control dogs pivotally mounted upon said transfer bars adjacent one end of said rails having an upright inoperative control position and a rearwardly inclined control position and including a tie bar interconnecting said latter dogs and journaled upon and between said transfer bars, said automatic dog tilting means being connected to said control dogs;

there being a corresponding detector cam arm, control cam, and cam roller for automatically tilting said load control dogs to load control position on retraction of said transfer bars;

a pair of opposed load cams bearing against said transfer bars at their ends, each load cam having a normally inclined inoperative position, and pivotal to an upright workpiece engaging position adapted to move a workpiece from a storage station on said rails to the next adjacent station;

and a pair of links respectively interconnecting said load control dogs and said load cams for movement in unison, said load dogs pivotally mounted upon said links.

References Cited
UNITED STATES PATENTS 3,127,981   4/1964   Sharpe _____ 198—221

EDWARD A. SROKA, *Primary Examiner.*